F. TWYMAN & A. GREEN.
APPARATUS FOR FINISHING PRISMS OR LENSES OR COMBINATIONS OF THE SAME.
APPLICATION FILED NOV. 21, 1917.
1,253,308. Patented Jan. 15, 1918.
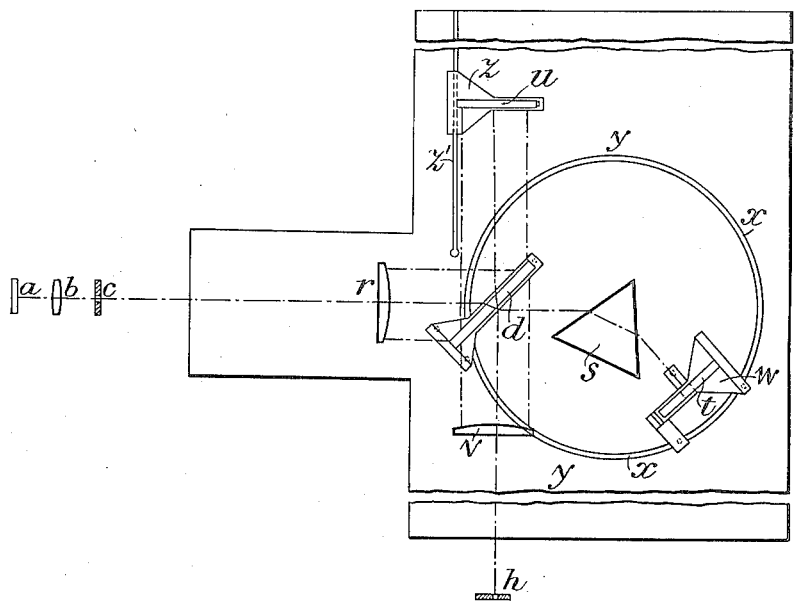
Inventors:
Frank Twyman
Alfred Green
By their Attorneys

UNITED STATES PATENT OFFICE.

FRANK TWYMAN AND ALFRED GREEN, OF LONDON, ENGLAND, ASSIGNORS TO ADAM HILGER LIMITED, OF LONDON, ENGLAND.

APPARATUS FOR FINISHING PRISMS OR LENSES OR COMBINATIONS OF THE SAME.

1,253,308. Specification of Letters Patent. Patented Jan. 15, 1918.

Original application filed December 12, 1916, Serial No. 136,504. Divided and this application filed November 21, 1917. Serial No. 203,187.

*To all whom it may concern:*

Be it known that we, FRANK TWYMAN and ALFRED GREEN, subjects of the King of Great Britain, both residing at 75ª Camden road, London, England, have invented new and useful Improvements in Apparatus for Finishing Prisms or Lenses or Combinations of the Same, of which the following is a specification.

The application for this patent is a division of our application for U. S. Patent Serial No. 136,504, filed Dec. 12, 1916.

This invention relates to improvements in apparatus for use in the manufacture of prisms and lenses or combinations of lenses and (or) prisms designed for the purposes of this specification as an optical element.

The object of this invention is to provide apparatus for correcting imperfections in an optical element which may be due to either faults of workmanship, faults such as residual spherical aberration of lenses which cannot be removed by computation and faults due to the want of homogeneity in the glass or other substance of which the optical element is made.

In the method of finishing employed which is the subject of another application a beam of light is passed through the optical element in such a way as to produce a series of interference rings which arrange themselves into what may be called a "contour map" of the imperfections. The workman preferably draws this map upon the surface under treatment and then removes the superfluous material from the prominences in the ordinary manner.

The instrument for producing the contour map resembles a well known form of interferometer in that a beam of light is divided into two parts, one passing (and preferably twice passing) through the optical element and being then recombined with the other part.

According to the present invention an instrument of the type set out is provided with means whereby both parts of the beam are brought to a focus at the eye of the observer, and such an instrument comprises a plane parallel glass plate partially silvered so that a part of the light is reflected and a part transmitted by it, two mirrors for reflecting the light back to the plate and mountings for the mirrors so that their distance from the plate can be varied.

The drawing shows diagrammatically a plan of an apparatus suitable for the correction of optical elements, which, receiving a plane beam of light, are required to deliver it after transmission as plane. In the figure the optical elements show this as a 60° prism such as is used for spectrum work.

Light from a suitable source is reflected by the mirror $a$ through a condensing lens $b$ on to the aperture of a diaphragm $c$.

The diverging beam of light is collimated by a lens $r$ and falls as a parallel beam on a plane parallel plate $d$, the second surface of which is partially silvered so that a part of the light is transmitted and a part reflected by it. One part passes through a 60° prism $s$, being refracted through it in the same way as in actual use, and being reflected by the mirror $t$, passes back through the prism to the plate $d$. The other part is reflected to the mirror $u$ and back again to the plate $d$ where the parts recombine and pass through a lens $v$ by which each is focused to form an image at the aperture of the diaphragm $h$.

The mirrors are adjusted to give coincidence of these two images, and the eye then being placed at the aperture in the diaphragm $h$ interference fringes are seen which represent what may be called a contour map.

The mirror $t$ is supported in a carriage $w$ having projections on its underside entering a circular groove $x$ in the table $y$, and the mirror $u$ is supported in a carriage $z$ having projections on its underside entering a groove $z^1$.

What we claim is:—

An apparatus for finishing optical elements comprising a plane parallel glass plate partially silvered and adapted to reflect part of a beam of light and transmit a part, a mirror mounted on a carriage, a projection on the carriage adapted to slide in a straight groove, another mirror mounted on another carriage, a projection on the carriage adapted to slide in a curved groove and means on the second carriage for holding an optical element in coöperative position with the mirror on the second carriage.

FRANK TWYMAN.
ALFRED GREEN.